US008730854B2

(12) United States Patent
Luo et al.

(10) Patent No.: US 8,730,854 B2
(45) Date of Patent: May 20, 2014

(54) TIMING ADJUSTMENTS IN A COMMUNICATION SYSTEM

(75) Inventors: Tao Luo, San Diego, CA (US); Dung Ngoc Doan, San Diego, CA (US); Wei-Jei Song, San Diego, CA (US); Daniel T. Macek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 12/859,089

(22) Filed: Aug. 18, 2010

(65) Prior Publication Data

US 2011/0044188 A1 Feb. 24, 2011

Related U.S. Application Data

(60) Provisional application No. 61/235,654, filed on Aug. 20, 2009.

(51) Int. Cl.
*H04B 7/00* (2006.01)

(52) U.S. Cl.
USPC .......................................................... 370/310

(58) Field of Classification Search
CPC . H04L 5/0007; H04L 27/2607; H04L 5/0051; H04B 7/0452; H04B 7/0617
See application file for complete search history.

(56) References Cited

U.S. PATENT DOCUMENTS

| 5,608,722 | A | * | 3/1997 | Miller | 370/320 |
| 8,149,685 | B2 | * | 4/2012 | Yucek et al. | 370/208 |
| 8,199,739 | B2 | * | 6/2012 | Sampath et al. | 370/343 |
| 8,385,311 | B2 | * | 2/2013 | Hong et al. | 370/345 |
| 2006/0203896 | A1 | * | 9/2006 | Clausen et al. | 375/219 |
| 2008/0165866 | A1 | * | 7/2008 | Teo et al. | 375/260 |

(Continued)

FOREIGN PATENT DOCUMENTS

| EP | 2079267 | 7/2009 |
| WO | WO2007138453 | 12/2007 |
| WO | WO2008084634 | 7/2008 |
| WO | WO2009052420 | 4/2009 |

OTHER PUBLICATIONS

3rd Generation Partnership Project; Technical Specification Group Radio Access Network; Evolved Universal Terrestrial Radio Access (E-UTRA); Physical layer procedures (Release 8), 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V8.8.0, Sep. 1, 2009, pp. 1-81, XP050377563.

(Continued)

*Primary Examiner* — Fan Ng
(74) *Attorney, Agent, or Firm* — Anthony R. Morris

(57) ABSTRACT

Methods, systems, apparatus and computer program products are provided to improve synchronization of information units communicated in a wireless communication system. Timing misalignment in the transmission of adjacent information units can produce gaps or overlaps in the transmitted information. In a long-term evolution (LTE) wireless communication system, such gaps and overlaps can be eliminated or reduced by adjusting the lengths of a cyclic prefix portion of one or more transmitted symbols. This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

24 Claims, 9 Drawing Sheets

(56) References Cited

U.S. PATENT DOCUMENTS

2009/0016268 A1* 1/2009 Yi et al. .................. 370/328
2009/0245222 A1* 10/2009 Sampath et al. ............ 370/343
2010/0034311 A1* 2/2010 Hasegawa .................. 375/267
2010/0135274 A1* 6/2010 Hong et al. ................ 370/345

OTHER PUBLICATIONS

International Search Report and Written Opinion—PCT/US2010/046043, International Search Authority—European Patent Office—Dec. 1, 2010.

Taiwan Search Report—TW099127983—TIPO—Jun. 24, 2013.

* cited by examiner

TIMING ADJUSTMENTS IN A COMMUNICATION SYSTEM

The present application claims priority to U.S. Provisional Patent Application Ser. No. 61/235,654, entitled "A METHOD AND APPARATUS FOR ADJUSTING CYCLIC PREFIX IN A WIRELESS COMMUNICATION SYSTEM," filed Aug. 20, 2009, the entirety of which is hereby incorporated by reference.

FIELD OF INVENTION

The present invention relates generally to the field of wireless communications and, more particularly to improving the synchronization of information communicated in a communication network.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal, or user equipment (UE), communicates with one or more base stations through transmissions on the forward and reverse links. The forward link (or downlink) refers to the communication link from the base stations to the user equipment, and the reverse link (or uplink) refers to the communication link from the user equipment to the base stations. This communication link can be established through a single-in-single-out, multiple-in-single-out or a multiple-in-multiple-out (MIMO) system.

It is customary to use timing control mechanisms in such multiple-access communication systems to provide synchronization of the uplink and downlink transmissions to fall within certain tolerances. For example, such a synchronization is needed to avoid interference between the user equipment with uplink data that are scheduled to be transmitted during the same information unit (e.g., a subframe of the communication system).

In some systems, the base station (or eNodeB) provides timing control information to allow a user equipment to adjust the timing of its uplink transmissions. However, such timing control information may not always be available to the user equipment. In addition, the synchronization between the uplink and downlink transmissions may become skewed or lost due to system and tracking tolerance errors and/or when a new timing control information is issued while the user equipment is still in the process of effecting a previous timing control command. As a result, the transmission of a particular uplink information unit may overlap with the transmission of an adjacent information unit. In another scenario, a gap may be created between the transmission of a particular uplink information unit and the transmission of an adjacent information unit. The presence of such gaps and overlaps can lead to a reduction in system throughput and inefficient use of network resources due to, for example, loss of transmitted data, additional retransmission requests and additional computational resources to detect and correct transmission errors and to maintain synchronization.

SUMMARY

The disclosed embodiments relate to systems, methods, apparatus and computer program products that enable efficient use of system resources by properly aligning the boundaries of transmitted information units in a communication network. As a results, gaps and overlaps between adjacent information units are reduced or eliminated. One aspect of the disclosed embodiments relates to a method that comprises determining if the boundary of an information unit in a communication system is not time-aligned with the boundary of an adjacent information unit, and adjusting a length of a cyclic prefix portion of the information unit to time-align the boundary of the information unit with the boundary of the adjacent information unit.

In one embodiment, the information unit is a subframe associated with the communication system and adjusting of the cyclic prefix portion comprises shortening or expanding the cyclic prefix portion of the subframe. In the scenario where the information unit is a subframe, determining that if the boundary of the information unit is not time-aligned with the boundary of an adjacent information unit can comprise detecting an overlap between the subframe and an adjacent subframe, and adjusting the length of the cyclic prefix portion can comprise shortening the cyclic prefix portion of the subframe. In another example, determining that if the boundary of the information unit is not time-aligned with the boundary of an adjacent information unit can comprise detecting a gap between the subframe and an adjacent subframe, and adjusting the length of the cyclic prefix portion can comprise expanding the cyclic prefix portion of the uplink subframe.

According to another embodiment, determining that if the boundary of the information unit is not time-aligned with the boundary of an adjacent information unit is carried out in accordance with information associated with a timing advance command. In one example, the timing advance command is received as part of a random access procedure initiated by a user equipment. In yet another embodiment, determining that if the boundary of the information unit is not time-aligned with the boundary of an adjacent information unit is carried out in accordance with information produced by a time tracking loop.

In still another embodiment, the information unit is an uplink subframe associated with the communication system, and determining that if the boundary of the information unit is not time-aligned with the boundary of an adjacent information unit is carried out in accordance with a timing of a downlink subframe. In another embodiment, determining that if the boundary of the information unit is not time-aligned with the boundary of an adjacent information unit comprises determining an extent of a timing misalignment between the boundary of the information unit and the boundary of the adjacent information unit.

According to another embodiment, adjusting of the length of the cyclic prefix portion is carried out over a plurality of cyclic prefix portions associated with a plurality of symbols.

In such a scenario, the plurality of symbols are selected from a group consisting of orthogonal frequency division multiplex (OFDM) symbols associated with one subframe of the communication system, and orthogonal frequency division multiplex (OFDM) symbols associated with multiple subframes of the communication system. In still another embodiment, adjusting of the length of the cyclic prefix portion is carried out in conformance with a criterion selected from a group consisting of a single-step maximum adjustment value, a minimum adjustment rate value, and a maximum adjustment rate value.

Another aspect of the disclosed embodiments relates to an apparatus that comprises means for determining if the boundary of an information unit in a communication system is not time-aligned with the boundary of an adjacent information unit, and means for adjusting a length of a cyclic prefix portion of the information unit to time-align the boundary of the information unit with the boundary of the adjacent information unit.

Another aspect of the disclosed embodiments relates to an apparatus that comprises a processor and a memory that comprises processor executable code. The processor executable code, when executed by the processor, configures the apparatus to determine if the boundary of an information unit in a communication system is not time-aligned with the boundary of an adjacent information unit. The processor executable code, when executed by the processor, further configures the apparatus to adjust a length of a cyclic prefix portion of the information unit to time-align the boundary of the information unit with the boundary of the adjacent information unit.

Another aspect of the disclosed embodiments relates to a computer program product, embodied on a computer readable medium, that comprises program code for determining if the boundary of an information unit in a communication system is not time-aligned with the boundary of an adjacent information unit. The computer program product, embodied on a computer readable medium, further comprises program code for adjusting a length of a cyclic prefix portion of the information unit to time-align the boundary of the information unit with the boundary of the adjacent information unit.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Various disclosed embodiments are illustrated by way of example, and not of limitation, by referring to the accompanying drawings, in which.

DETAILED DESCRIPTION

Figure 1:
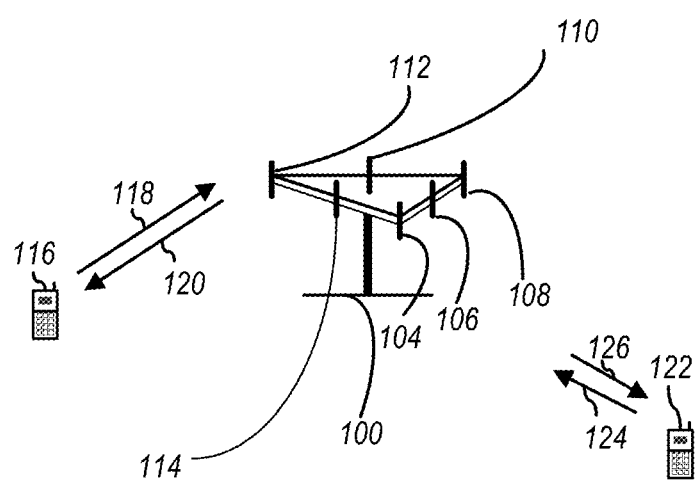
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, wireless node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

As noted earlier, communications in the uplink and downlink between the base station and user equipment can be established through a single-in-single-out, multiple-in-single-out or a multiple-in-multiple-out (MIMO) system. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the first antenna 104 and the second antenna 106 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

| | |
|---|---|
| 3G | 3rd Generation |
| 3GPP | 3rd Generation Partnership Project |
| ACLR | Adjacent channel leakage ratio |
| ACPR | Adjacent channel power ratio |
| ACS | Adjacent channel selectivity |
| ADS | Advanced Design System |
| AMC | Adaptive modulation and coding |
| A-MPR | Additional maximum power reduction |
| ARQ | Automatic repeat request |
| BCCH | Broadcast control channel |
| BTS | Base transceiver station |
| CDD | Cyclic delay diversity |
| CCDF | Complementary cumulative distribution function |
| CDMA | Code division multiple access |
| CFI | Control format indicator |
| Co-MIMO | Cooperative MIMO |
| CP | Cyclic prefix |
| CPICH | Common pilot channel |
| CPRI | Common public radio interface |
| CQI | Channel quality indicator |
| CRC | Cyclic redundancy check |
| DCI | Downlink control indicator |
| DFT | Discrete Fourier transform |
| DFT-SOFDM | Discrete Fourier transform spread OFDM |
| DL | Downlink (base station to subscriber transmission) |
| DL-SCH | Downlink shared channel |
| DSP | Digital signal processing |
| DT | Development toolset |
| DVSA | Digital vector signal analysis |
| EDA | Electronic design automation |
| E-DCH | Enhanced dedicated channel |
| E-UTRAN | Evolved UMTS terrestrial radio access network |
| eMBMS | Evolved multimedia broadcast multicast service |
| eNB | Evolved Node B |
| EPC | Evolved packet core |
| EPRE | Energy per resource element |
| ETSI | European Telecommunications Standards Institute |
| E-UTRA | Evolved UTRA |
| E-UTRAN | Evolved UTRAN |
| EVM | Error vector magnitude |
| FDD | Frequency division duplex |
| FFT | Fast Fourier transform |
| FRC | Fixed reference channel |
| FS1 | Frame structure type 1 |
| FS2 | Frame structure type 2 |
| GSM | Global system for mobile communication |
| HARQ | Hybrid automatic repeat request |
| HDL | Hardware description language |
| HI | HARQ indicator |

-continued

| | |
|---|---|
| HSDPA | High speed downlink packet access |
| HSPA | High speed packet access |
| HSUPA | High speed uplink packet access |
| IFFT | Inverse FFT |
| IOT | Interoperability test |
| IP | Internet protocol |
| LO | Local oscillator |
| LTE | Long term evolution |
| MAC | Medium access control |
| MBMS | Multimedia broadcast multicast service |
| MBSFN | Multicast/broadcast over single-frequency network |
| MCH | Multicast channel |
| MIMO | Multiple input multiple output |
| MISO | Multiple input single output |
| MME | Mobility management entity |
| MOP | Maximum output power |
| MPR | Maximum power reduction |
| MU-MIMO | Multiple user MIMO |
| NAS | Non-access stratum |
| OBSAI | Open base station architecture interface |
| OFDM | Orthogonal frequency division multiplexing |
| OFDMA | Orthogonal frequency division multiple access |
| PAPR | Peak-to-average power ratio |
| PAR | Peak-to-average ratio |
| PBCH | Physical broadcast channel |
| P-CCPCH | Primary common control physical channel |
| PCFICH | Physical control format indicator channel |
| PCH | Paging channel |
| PDCCH | Physical downlink control channel |
| PDCP | Packet data convergence protocol |
| PDSCH | Physical downlink shared channel |
| PHICH | Physical hybrid ARQ indicator channel |
| PHY | Physical layer |
| PRACH | Physical random access channel |
| PMCH | Physical multicast channel |
| PMI | Pre-coding matrix indicator |
| P-SCH | Primary synchronization signal |
| PUCCH | Physical uplink control channel |
| PUSCH | Physical uplink shared channel. |

Figure 2:
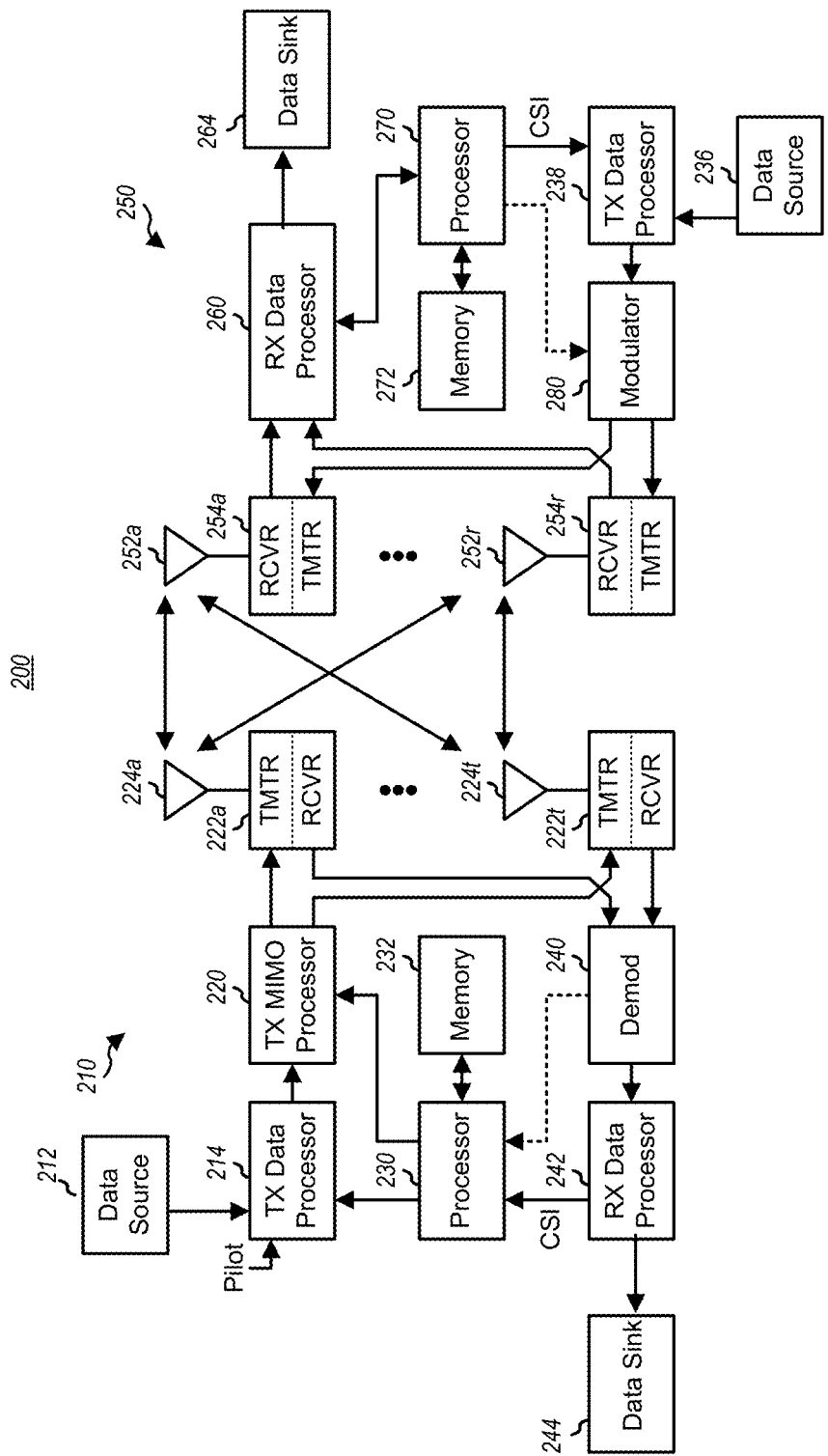
FIG. 2 illustrates a block diagram of a communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/ or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

Figure 3:
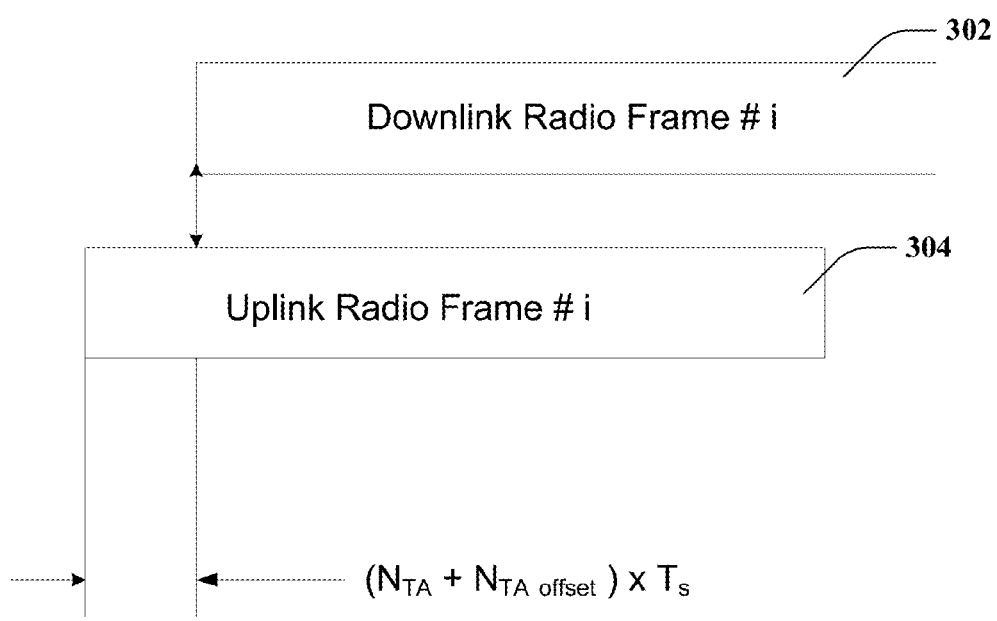
FIG. 3 is a timing diagram for the uplink and downlink radio frames in a communication system.

As noted earlier, some multiple-access communication systems provide timing control mechanisms to synchronize a user equipment's uplink and downlink transmissions. In particular, in LTE Rel-8 systems, the eNB provides a timing advance (TA) command to the user equipment with information as to how the timing of the uplink transmission radio frames should be adjusted relative to the current timing of the downlink radio frames associated with that user equipment. FIG. 3 illustrates the timing relationships between the uplink and downlink radio frames for a given user equipment of a communication system. As illustrated in FIG. 3, the transmission of the uplink radio frame i 304 must start $(N_{TA}+N_{TA\ offset}) \times T_s$ seconds before the transmission of the downlink radio frame i 302, where $T_s$ is the basic time unit and is equal to $1/(15,000 \times 2,048)$ seconds for LTE systems. $N_{TA\ offset}$ is zero for LTE frame structure type 1 and 624 for LTE frame structure type 2 (other than in a random access response, in which $N_{TA\ offset}$ is zero for both frame structure types). In addition, $0 \leq N_{TA} \leq 20,512$ for both type 1 and type 2 frame structures.

In LTE Rel-8 systems, frame structure type 1 is used for full duplex and half duplex FDD and is 10 ms in duration. Each frame structure type 1 consists of 20 slots, numbered 0 to 19, where two consecutive slots define a subframe. Moreover, with a frame structure type 1, 10 subframes are available for downlink transmission and 10 subframes are available for uplink transmission in each 10 ms frame interval. LTE frame structure type 2, which is applicable to TDD, is also 10 ms in duration but is divided into two 5-ms half-frames. Each half-frame is, in turn, divided into 5 subframes of 1 ms duration. The subframes of a type 2 frame structure can be designated for uplink, downlink and "special" subframe transmissions in a particular order that is specified in the LTE Rel-8 specifications.

Referring back to FIG. 3, a timing advance command enables the user equipment to ascertain the value of $N_{TA}$ in order to effect the timing adjustment $(N_{TA}+N_{TA\ offset}) \times T_s$. The eNodeB can provide the timing advance command in one of two situations. First, a timing advance command may be issued as part of a random access procedure, which can occur when, for example, a user equipment has lost synchronization due to radio link failures, non-synchronized handovers, after a significant period of inactivity and the like. A similar procedure may also be needed when a user equipment is placed in discontinuous reception (DRX) mode to preserve the battery life of the user equipment. As part of the random access procedure, the user equipment transmits a random access preamble to the eNodeB. The eNodeB's response includes an 11-bit timing advance command that provides index values $T_A = 0, 1, 2, \ldots, 1282$ which are used to determine the amount of timing adjustment as: $N_{TA}=16T_A$. As noted earlier, $N_{TA\ offset}$ associated with a random access response and/or a DRX cycle is zero for both FDD and TDD. Further, the downlink timing associated with a random access response and/or a DRX cycle is defined based on the first detected path (in time) of the corresponding downlink radio frame that is received from the reference cell. The accuracy requirement for implementing the timing advance (for a system with bandwidth greater than or equal to 3 MHz) should be better than or equal to $\pm 12T_s$ relative to the signaled timing advance. Such tolerance values are only provided to serve as examples and may be different in other communication systems that can accommodate the disclosed embodiments.

Once synchronization is established, the eNodeB measures the timing of the user equipment uplink signal and, if needed, sends additional timing advance commands to the user equipment. Such additional timing advance commands that are not provided as part of the random access response use 6 bits to indicate an adjustment to the existing $N_{TA}$ value (i.e., $N_{TA,old}$). The new $N_{TA}$ value can be calculated as: $N_{TA,new}=N_{TA,old}+(T_A-31)\times16$, where $T_A=0, 1, \ldots, 63$. As evident from the above expression, a $T_A$ value greater than 31 results in a positive adjustment to $N_{TA,old}$, while a $T_A$ of less than 31 results in a negative adjustment to $N_{TA,old}$. The accuracy requirement for implementing the timing advance should be better than or equal to $\pm 4T_s$ relative to the signaled timing advance and as compared to the previous uplink transmission. Such tolerance values may be different in other communication systems that can accommodate the disclosed embodiments. Further, according to the LTE Rel-8 specifications, for a timing advance command that is received in subframe n, the user equipment must apply the timing adjustment from the beginning of subframe n+6. Moreover, when such an adjustment results in an overlap in two consecutive subframes and i+1, the LTE Rel-8 specifications require that the overlapped portions of subframe i+1 not to be transmitted. It is evident that such a loss in transmitted information can result in loss of data, additional computations to detect, correct and/or request retransmission of the missing data.

The timing advance commands are only sent when eNodeB becomes aware of a need for timing adjustment. Therefore, in situations where no timing advance command is received, the user equipment must effect the necessary timing adjustments based on the downlink timing. The downlink timing is determined based on the first detected path (in time) of the corresponding downlink radio frame that is received from the reference cell. The downlink timing may be adjusted by the downlink time tracking loop (TTL), which is used for acquiring, monitoring and adjusting of the timing signals. If the downlink and uplink timing synchronization are not within $\pm T_s$, the user equipment updates the value of $N_{TA}$ (e.g., based on a previously received timing advance command) in one or more steps until the proper timing synchronization is obtained.

In effecting timing adjustments, the user equipment is typically required to limit the magnitude and the rate of adjustments to certain minimum/maximum values. For example, a user equipment may be limited to a maximum single-step change of $2T_s$ per adjustment attempt. In another example, the user equipment may be limited to a minimum adjustment rate of $7T_s$ per second, and a maximum adjustment rate of $2T_s$ per 200 ms. The above maximum and minimum values are only provided to serve as examples and may be different in other communication networks that can accommodate the disclosed embodiments.

Figure 4:
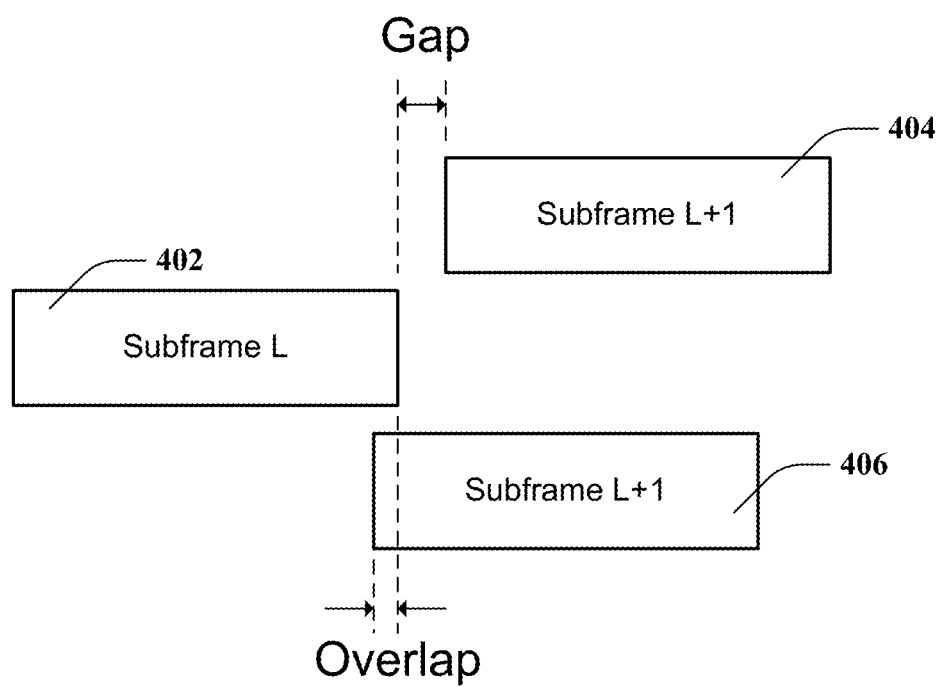
FIG. 4 is a diagram illustrating a timing misalignment between adjacent subframes of communication system.

The application of timing adjustments by the user equipment can create gaps and/or overlaps between the adjacent information units that are transmitted in the uplink direction. FIG. 4 illustrates an exemplary gap and an exemplary overlap that may be created in the transmission of the uplink subframes. In particular, FIG. 4 shows a gap may be created when the transmission of "subframe L+1" 404 does not start immediately after the transmission of "subframe L" 402. An overlap can be created if the start of "subframe L+1" 406 is scheduled to be transmitted before "subframe L" 402 has been fully transmitted. While, FIG. 4 illustrates subframes of a downlink transmission, it is understood that such gaps and overlaps can occur in the transmission of any information unit that is transmitted independently from an adjacent information unit.

The disclosed embodiments enable the elimination and/or reduction of such gaps and overlaps in the transmission of adjacent information units by adjusting an extent (e.g., duration) of one or more information units. In an example embodiment, the cyclic prefix portion of a subframe is adjusted to eliminate or reduce the extent of such gaps and/or overlaps. For instance, such an adjustment capability can be implemented by configuring a cyclic prefix generator to produce cyclic prefixes of variable durations, rather than producing fixed-size cyclic prefixes.

Figure 5:
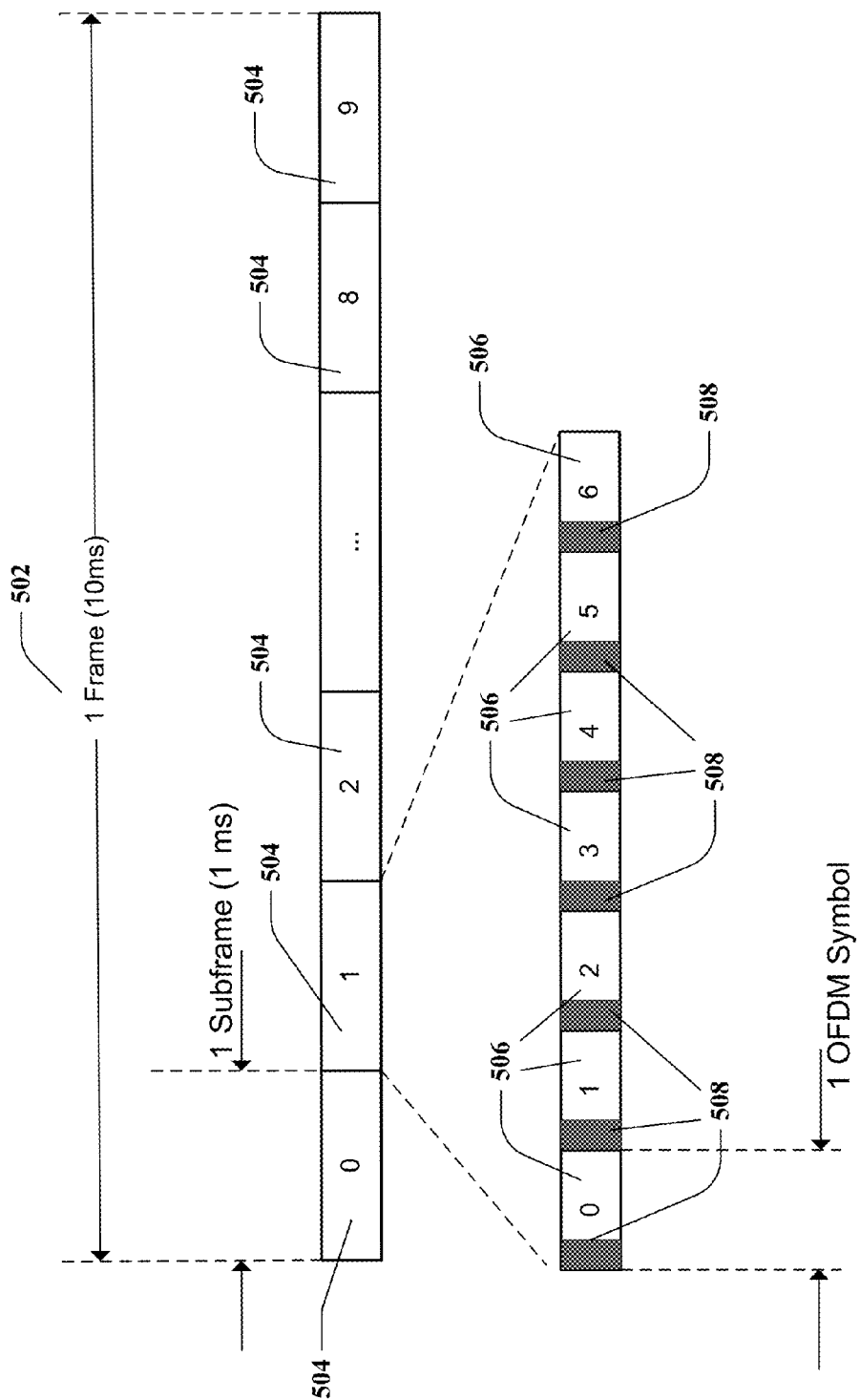
FIG. 5 is an exemplary frequency division duplex (FDD) frame structure.

The features of the disclosed embodiments may be better understood with reference to FIG. 5. This figure illustrates a type 1 (FDD) frame structure in an LTE system. As noted earlier, with this frame structure, a frame 502 is 10 ms in duration and comprises 10 subframes 504. Each subframe 504 consists of either 6 or 7 OFDM symbols 506, depending on whether an extended or normal prefix is used. The subframe that is depicted in FIG. 5 has 7 OFDM symbols 506 and each OFDM symbol 506 starts with a normal cyclic prefix 508.

One of the functions of the cyclic prefix is to facilitate the operation of the wireless network in the presence of intersymbol interference (ISI) that is produced due to the arrival of signals by paths of differing lengths (i.e., multipath distortion). In this context, the cyclic prefix acts as a guard band between the OFDM symbols that are discarded once the signal is received. Therefore, as long as the multipath signal delay spread is within the duration of the cyclic prefix, the ISI can be corrected. When normal prefix code is used, the duration of the cyclic prefix is $160T_s$, or 5.2 µs, for the first OFDM symbol and $144T_s$, or 4.7 µs, for the remaining 6 OFDM symbols of a subframe. An extended cyclic prefix may also be used in situations where a higher multipath distortion is anticipated. The duration of the extended cyclic prefix is identical for all OFDM symbols within a subframe with a particular subcarrier spacing. For example, the duration of the extended cyclic prefix is $512T_s$, or 16.67 µs, when a subcarrier spacing of 15 kHz is used and $1024T_s$, or 33.33 µs, when a subcarrier spacing of 7.5 kHz is used. Type 2 TDD frames also utilize a cyclic prefix at the beginning of each OFDM symbol. However, the duration of normal and extended prefix portions within the "special" subframes differ depending on the special subframe configuration and the direction of transmission (uplink versus downlink).

Another function of the cyclic prefix is to facilitate frequency domain processing of the received signals by improving channel estimation and equalization. The OFDM symbols are generated by performing an inverse discrete Fourier transform (IDFT), a form of inverse fast Fourier transform (IFFT), that converts frequency domain samples into time domain samples. The samples are subsequently transmitted to the target entity in the wireless network (e.g., a user equipment, eNode B, etc.). Upon reception of the signal, the time samples are converted back to the frequency domain and multiplied by the transmission channel transfer function to obtain estimates of the originally transmitted samples. According to DFT principles, multiplication of the received samples by the channel transfer function produces a proper estimate of the transmitted samples only if the transmitted time domain samples are circularly (and not linearly) convolved with the transmission channel impulse response. In order to mimic such a circular convolution, the cyclic prefix, which is appended to the beginning of an OFDM symbol, includes samples that are duplicates of the end samples of the OFDM symbol.

Figure 6:
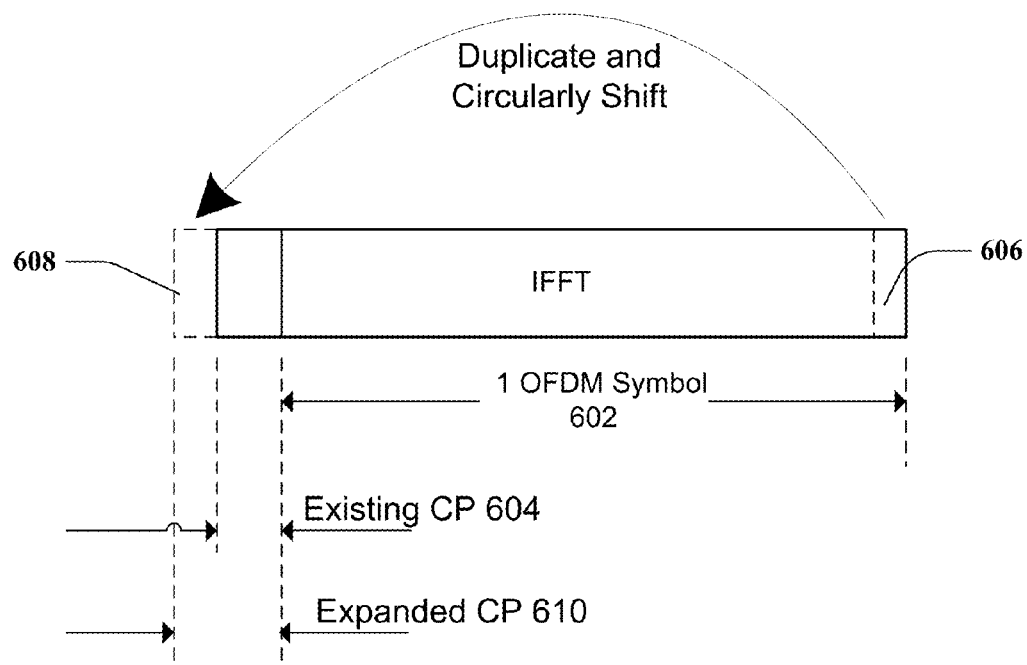
FIG. 6 illustrates an expansion of a cyclic prefix in accordance with an exemplary embodiment.

According to an embodiment, if a gap between two adjacent frames is detected, the cyclic prefix portion of one or more OFDM symbols is expanded (i.e., increased in length) to reduce or eliminate the gap. An increase in cyclic prefix length can result in better system performance by providing better multipath immunity and enhanced channel estimation. To facilitate channel estimation and equalization as noted above, the new cyclic prefix can be generated by duplicating one or more end samples of the corresponding OFDM symbol. In one embodiment, the expanded cyclic prefix is generated by duplicating and circularly shifting one or more samples from the end portion of the OFDM symbol IFFT samples to the beginning of an existing cyclic prefix portion. This operation is pictorially illustrated in FIG. 6, where one or more IFFT samples 606 from the end portion of an OFDM symbol 602 are duplicated and circularly shifted to the beginning of an existing cyclic prefix 604. As such, an expanded cyclic prefix 610 is created while the duration of the OFDM symbol 602 (excluding the prefix portion) remains unchanged.

In another example embodiment, the expanded portion 608 of the expanded cyclic prefix 610 comprises samples that are not selected from the OFDM symbol 602. For instance, the expanded portion 608 of the expanded cyclic prefix 610 can include randomly generated samples. In yet another example embodiment, only a portion of the expanded portion 608 of the expanded cyclic prefix 610 comprises circularly shifted samples of the OFDM symbol 602. For instance, the expanded portion 608 of the expanded cyclic prefix 610 can include k samples from the OFDM symbol 602 that are duplicated and circularly shifted, in addition to m−k samples that are selected from another source (e.g., randomly selected samples). In this example, m is the total number of samples in the expanded portion 608 of the expanded cyclic prefix 610. It should be noted that the extent of the expanded cyclic prefix 610 can be made to only comprise a few samples in order to, for example, conform to certain system or standard requirements. In one embodiment, the expansion of the cyclic prefix can be shared among multiple OFDM symbols to conform to system timing requirements and/or to distribute the associated performance improvement across the subframe.

According to another embodiment, if an overlap between two adjacent frames is detected, the cyclic prefix portion of one or more OFDM symbols is decreased in duration to reduce or eliminate the gap. For example, one or more samples at the beginning of a cyclic prefix corresponding to an OFDM symbol may be discarded. The shortening of the cyclic prefix that is conducted in accordance with the disclosed embodiments is not likely to adversely affect the system performance since only a few samples are discarded. In addition, the shortening of the cyclic prefix may be spread among a plurality of OFDM symbol prefixes to reduce performance penalties associated with any single OFDM symbol. For example, with reference to FIG. 5, an overlap between subframe 0 and subframe 1 can result in the shortening of the cyclic prefixes associated of one or more OFDM symbols 0 through 6.

In effecting the timing adjustments in accordance with the disclosed embodiments, several system limitations may also need to be considered. In particular, as noted earlier, system requirements of a wireless communication network may place restrictions on the maximum, minimum and step-wise changes in the value and rate of timing adjustments. For example, each timing adjustment step may be limited to a maximum single-step change of $2T_s$ and a maximum adjustment rate of $2T_s$ per 200 ms. According to some embodiments, if the system limitations of the communication network do not allow the implementation of a required timing adjustment within a particular time period (or within a particular number of steps), the required timing adjustment is carried out over a plurality of OFDM symbols and/or across multiple subframes. For example, with reference to FIG. 5, a required timing adjustment that is to be applied to "subframe 1" 504 can be spread among two or more OFDM symbols 506 of subframe 1, subframe 2 or subsequent subframes, if needed.

In some embodiments, the timing advance command can be analyzed to determine whether or not a timing adjustment is needed and to ascertain the amount of the required timing adjustment. For example, when a timing advance command, other than in a random access response, is received in subframe n, the prescribed timing adjustment must be carried out by the user equipment from the beginning of subframe n+6. As a result, a gap and/or overlap may be produced between uplink subframes n+5 and n+6. In other scenarios, a new timing advance command may be received while the user equipment is still in the process of applying the existing timing advance command. In such cases, the unfinished portions of the existing timing adjustment may be ignored in order to effect the newly arrived timing adjustment. Timing adjustments can also be monitored, triggered and applied with the aid of a time tracking loop (TTL) at the user equipment. As noted earlier, the TTL is capable of monitoring the timing and synchronization of signals. For example, in situations where no timing advance command is received from the eNodeB, the TTL, which is tracking the downlink timing, can signal a need for a timing adjustment. Such a scenario can occur when, for example, the timing synchronization between a downlink and an uplink subframe exceeds a predetermined threshold.

Figure 7:
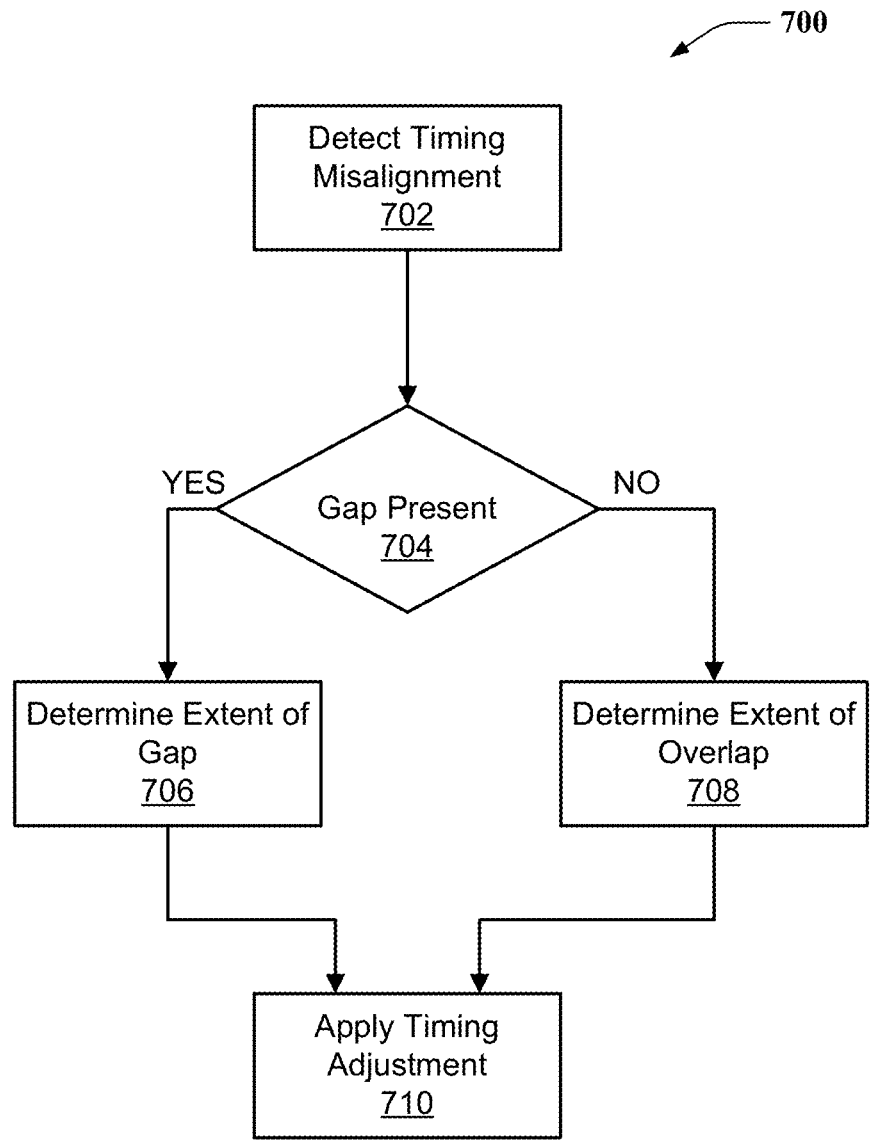
FIG. 7 is a flowchart illustrating the operations of one embodiment.

FIG. 7 illustrates the operations that may be carried out in accordance with an example embodiment. The process 700 that is described in FIG. 7 starts, at 502, when a timing misalignment is detected. A timing misalignment can occur if a boundary of an information unit is not time-aligned with the boundary of an adjacent information unit. The misalignment can be associated, for example, with the downlink subframes of a wireless communication network. As noted earlier, a misalignment (or a potential misalignment) can be detected by analyzing the received timing advance commands from an eNodeB associated with a user equipment and/or using a time tracking loop (TTL) at the user equipment. For example, the received timing advance command and/or TTL adjustment values can be evaluated to determine if the application of the timing adjustments would result in a timing misalignment of adjacent frames.

Referring back to FIG. 7, once a misalignment is detected, it is determined, at 704, if the misalignment results in a gap between adjacent information units. If a gap is present ("YES"), the process 700 continues, at 708, to determine the extent of the gap. In particular, the current timing of the information units can be compared against a newly computed timing based on the required timing adjustments to assess the extent of a gap (or overlap) that would be created at the boundaries of particular information units. After determining the extent of the gap, the timing adjustment that is necessary to reduce or eliminate the gap is applied (or configured to be applied), at 710. As noted earlier, in one embodiment, cyclic prefix of one or more OFDM symbols can be expanded.

If, at 702, the determination is made that a gap is not present ("NO"), an overlap must exist. In that case, the process 700 continues, at 708, to determine the extent of the overlap. This determination can be done similar to extent of gap determination discussed earlier. In particular, the required timing adjustments can be used to project the extent of an overlap between two adjacent information units at a particular point in time (e.g., at the boundary between the upcoming fifth and sixth subframes). After the determination of the extent of the overlap is completed, the timing adjustment that is necessary to reduce or eliminate the overlap is applied, at 710. For example, cyclic prefix associate with one or more OFDM symbols can be reduced in length. As noted earlier, a timing adjustment, corresponding to either a gap or an overlap, can be spread among one or more OFDM symbols within a subframe, and in some embodiments, among one or more OFDM symbols of different subframes. Such a spreading of the timing adjustment among multiple symbols can spread the robustness penalties or improvements among multiple OFDM symbols, and can keep the step-wise value and/or rate of the timing adjustments to within system requirements. It should be also noted, that the block diagram of FIG. 7 can include additional or fewer operations. Further, some of the operations may be carried out in a different order. For example, instead of determining if a gap is present, at 704, it can be first determined if an overlap is present. In another variation, the determination of the presence of a gap and an overlap can be carried out simultaneously.

Figure 8:
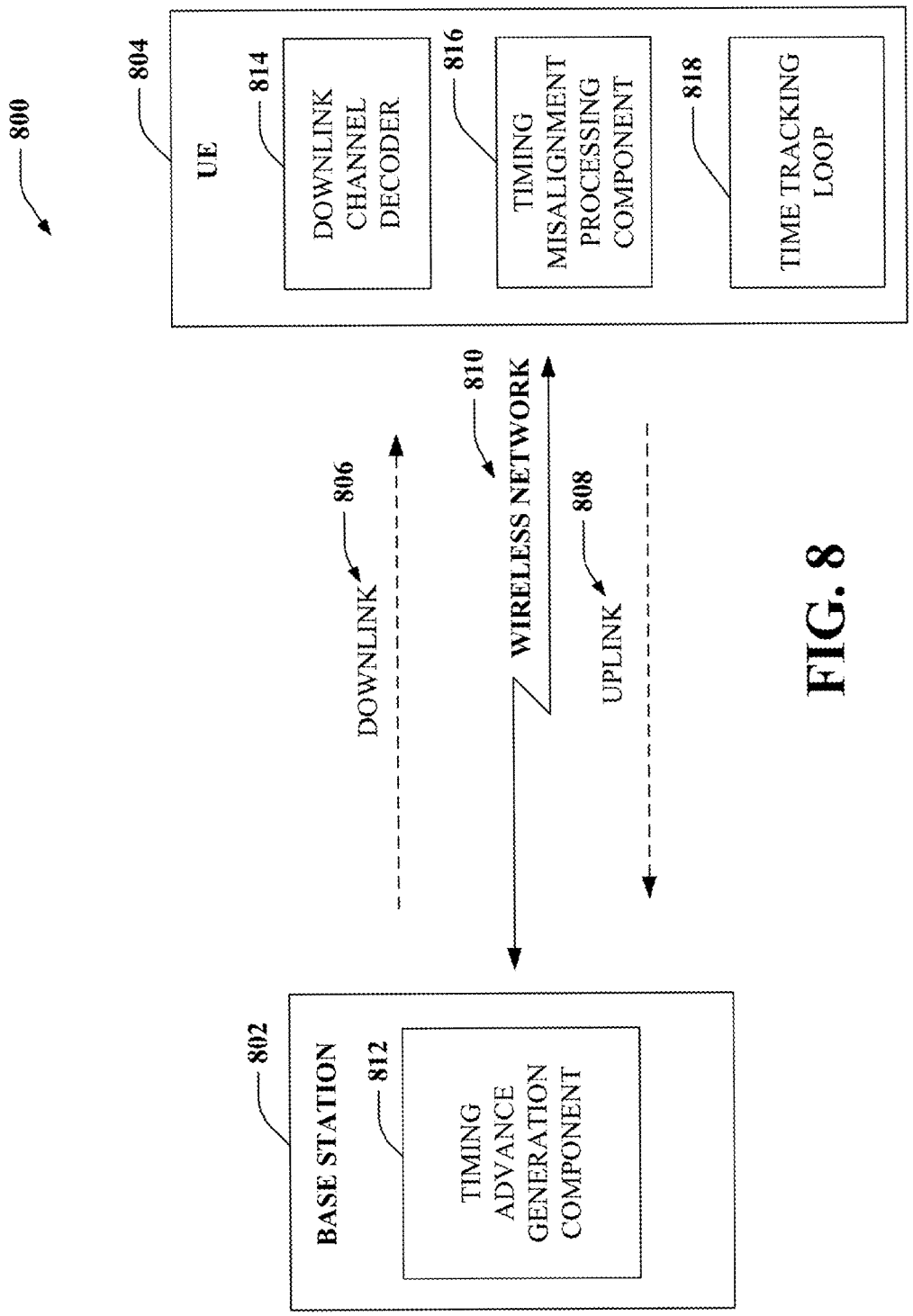
FIG. 8 illustrates a system within which various embodiments may be implemented.

FIG. 8 illustrates an exemplary system 800 capable of supporting the various operations described above. System 800 includes a base station 802 that can transmit and/or receive information, signals, data, instructions, commands, bits, symbols and the like. Base station 802 can communicate with a user equipment (UE) 804 via a downlink (forward channel) 806 and an uplink (reverse channel) 808 utilizing a wireless network 810. UE 804 can transmit and/or receive information, signals, data, instructions, commands, bits, symbols and the like. Moreover, although not shown, it is contemplated that any number of base stations similar to base station 802 can be included in system 800 and/or any number of UEs similar to UE 804 can be included in system 800.

Base station 802 may include a timing advance generation component 812 that can produce the timing advance commands for the UE 804. Further, UE 804 can include a downlink channel decoder 814, a timing misalignment processing component 816 and a time tracking loop 818. Downlink channel decoder 814 can decode a control channel. Thus, for example, downlink channel decoder 814 can decode a physical downlink control channel (PDCCH). The timing misalignment processing component 816 can, for example, use the information that is provided by the time tracking loop 818 and/or timing advance information provided by the base station 802, to detect a timing misalignment between uplink frames of the UE 804, to determine an extent of a gap or overlap that is produced because of the misalignment, and to apply the timing adjustments to the uplink subframes.

Figure 9:
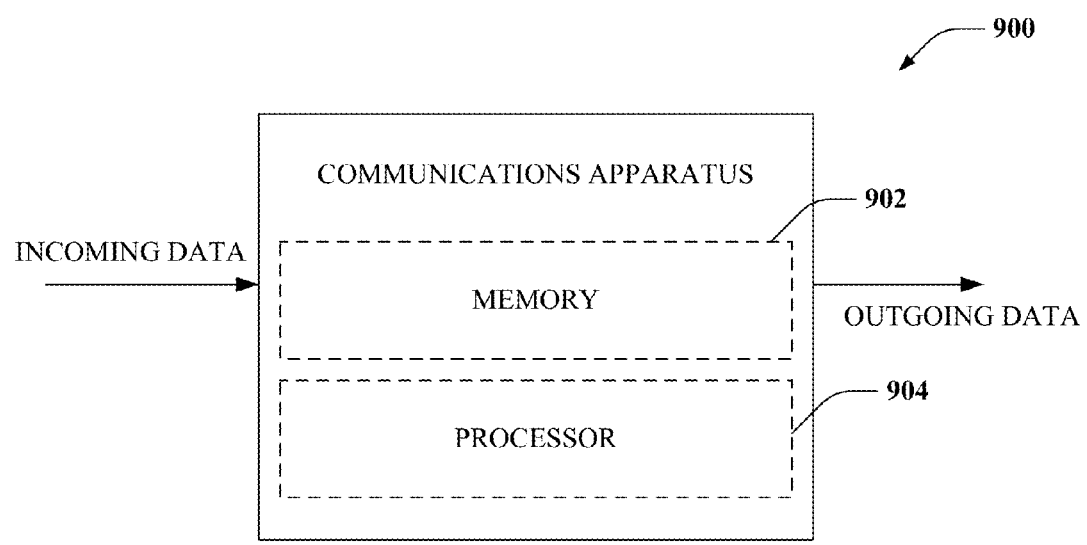
FIG. 9 illustrates an apparatus within which various embodiments may be implemented.

FIG. 9 illustrates an apparatus 900 within which the various disclosed embodiments may be implemented. In particular, the apparatus 900 that is shown in FIG. 9 may comprise at least a portion of a base station or at least a portion of a user equipment (such as the base station 802 and the user equipment 804 that are depicted in FIG. 8) and/or at least a portion of a transmitter system or a receiver system (such as the transmitter system 210 and the receiver system 250 that are depicted in FIG. 2). The apparatus 900 that is depicted in FIG. 9 can be resident within a wireless network and receive incoming data via, for example, one or more receivers and/or the appropriate reception and decoding circuitry (e.g., antennas, transceivers, demodulators and the like). The apparatus 900 that is depicted in FIG. 9 can also transmit outgoing data via, for example, one or more transmitters and/or the appropriate encoding and transmission circuitry (e.g., antennas, transceivers, modulators and the like). Additionally, or alternatively, the apparatus 900 that is depicted in FIG. 9 may be resident within a wired network.

FIG. 9 further illustrates that the apparatus 900 can include a memory 902 that can retain instructions for performing one or more operations, such as signal conditioning, analysis and the like. Additionally, the apparatus 900 of FIG. 9 may include a processor 904 that can execute instructions that are stored in the memory 902 and/or instructions that are received from another device. The instructions can relate to, for example, configuring or operating the apparatus 900 or a related communications apparatus. It should be noted that while the memory 902 that is depicted in FIG. 9 is shown as a single block, it may comprise two or more separate memories that constitute separate physical and/or logical units. In addition, the memory while being communicatively connected to the processor 904, may reside fully or partially outside of the apparatus 900 that is depicted in FIG. 9. It is also to be understood that one or more components, such as the timing advance generation component 812, the timing misalignment processing component 816 and the time tracking loop 818 that are shown in FIG. 8, can exist within a memory such as memory 902.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 900 of FIG. 9 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 804 FIG. 8). In the alternative, the processor and the storage medium may reside as discrete components in a user equipment (e.g., 804 FIG. 8). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method, comprising:
   determining if boundary of an information unit in a communication system is not time-aligned with boundary of an adjacent information unit; and
   adjusting a length of a cyclic prefix portion of the information unit to time-align the boundary of the information unit with the boundary of the adjacent information unit, wherein the information unit is an uplink subframe associated with the communication system, and wherein the adjusting is carried out over three or more consecutive cyclic prefix portions associated with three or more symbols such that each of the three or more cyclic prefix portions is consecutively increases in length or each of the three or more cyclic portions consecutively decreases in length.

2. The method of claim 1, wherein
the adjusting comprises shortening or expanding the cyclic prefix portion of the uplink subframe.

3. The method of claim 2, wherein
the determining comprises detecting an overlap between the uplink subframe and an adjacent uplink subframe; and
the adjusting comprises shortening the cyclic prefix portion of the uplink subframe.

4. The method of claim 2, wherein
the determining comprises detecting a gap between the uplink subframe and an adjacent uplink subframe; and
the adjusting comprises expanding the cyclic prefix portion of the uplink subframe.

5. The method of claim 1, wherein the determining is carried out in accordance with information associated with a timing advance command.

6. The method of claim 5, wherein the timing advance command is received as part of a random access procedure initiated by a user equipment.

7. The method of claim 1, wherein the determining is carried out in accordance with information produced by a time tracking loop.

8. The method of claim 1, wherein
the determining is carried out in accordance with a timing of a downlink subframe.

9. The method of claim 1, wherein the determining comprises determining an extent of a timing misalignment between the boundary of the information unit and the boundary of the adjacent information unit.

10. The method of claim 1, wherein the three or more symbols are selected from a group consisting of:
   orthogonal frequency division multiplex (OFDM) symbols associated with one subframe of the communication system; and
   orthogonal frequency division multiplex (OFDM) symbols associated with multiple subframes of the communication system.

11. The method of claim 1, wherein the adjusting is carried out in conformance with a criterion selected from a group consisting of:
   a single-step maximum adjustment value;
   a minimum adjustment rate value; and
   a maximum adjustment rate value.

12. An apparatus, comprising:
   means for determining if boundary of an information unit in a communication system is not time-aligned with boundary of an adjacent information unit; and
   means for adjusting a length of a cyclic prefix portion of the information unit to time-align the boundary of the information unit with the boundary of the adjacent information unit, wherein the information unit is an uplink subframe associated with the communication system, and wherein the adjusting is carried out over three or more consecutive cyclic prefix portions associated with three or more symbols such that each of the three or more cyclic prefix portions consecutively increases in length or each of the three or more cyclic portions consecutively decreases in length.

13. An apparatus, comprising:
a processor; and
a memory comprising processor executable code, the processor executable code, when executed by the processor, configures the apparatus to:
determine if boundary of an information unit in a communication system is not time-aligned with boundary of an adjacent information unit; and
adjust a length of a cyclic prefix portion of the information unit to time-align the boundary of the information unit with the boundary of the adjacent information unit, wherein the information unit is an uplink subframe associated with the communication system, and wherein the adjusting is carried out over three or more consecutive cyclic prefix portions associated with three or more symbols such that each of the three or more cyclic prefix portions is consecutively increases in length or each of the three or more cyclic portions consecutively decreases in length.

14. The apparatus of claim 13, wherein
the processor executable code, when executed by the processor, configures the apparatus to shorten or expand the cyclic prefix portion of the uplink subframe.

15. The apparatus of claim 14, wherein the processor executable code, when executed by the processor, configures the apparatus to:
detect an overlap between the uplink subframe and an adjacent uplink subframe; and
shorten the cyclic prefix portion of the uplink subframe.

16. The apparatus of claim 14, wherein the processor executable code, when executed by the processor, configures the apparatus to:
detect a gap between the uplink subframe and an adjacent uplink subframe; and
expand the cyclic prefix portion of the uplink subframe.

17. The apparatus of claim 13, wherein the processor executable code, when executed by the processor, configures the apparatus to determine if the boundary of the information unit is not time-aligned with boundary of an adjacent information unit in accordance with information associated with a timing advance command.

18. The apparatus of claim 17, wherein the timing advance command is received as part of a random access procedure initiated by the apparatus.

19. The apparatus of claim 13, wherein the processor executable code, when executed by the processor, configures the apparatus to determine if the boundary of the information unit is not time-aligned with boundary of an adjacent information unit in accordance with information produced by a time tracking loop.

20. The apparatus of claim 13, wherein
the processor executable code, when executed by the processor, configures the apparatus to determine if the boundary of the information unit is not time-aligned with boundary of an adjacent information unit in accordance with a timing of a downlink subframe.

21. The apparatus of claim 13, wherein the processor executable code, when executed by the processor, configures the apparatus to determine an extent of a timing misalignment between the boundary of the information unit and the boundary of the adjacent information unit.

22. The apparatus of claim 13, wherein the three or more symbols are selected from a group consisting of:
orthogonal frequency division multiplex (OFDM) symbols associated with one subframe of the communication system; and
orthogonal frequency division multiplex (OFDM) symbols associated with multiple subframes of the communication system.

23. The apparatus of claim 13, wherein the processor executable code, when executed by the processor, configures the apparatus to adjust the length of the cyclic prefix portion in conformance with a criterion selected from a group consisting of:
a single-step maximum adjustment value;
a minimum adjustment rate value; and
a maximum adjustment rate value.

24. A computer program product, embodied on a non-transitory computer readable medium, comprising:
program code for determining if boundary of an information unit in a communication system is not time-aligned with boundary of an adjacent information unit; and
program code for adjusting a length of a cyclic prefix portion of the information unit to time-align the boundary of the information unit with the boundary of the adjacent information unit, wherein the information unit is an uplink subframe associated with the communication system, and wherein the adjusting is carried out over three or more consecutive cyclic prefix portions associated with three or more symbols such that each of the three or more cyclic prefix portions consecutively increases in length or each of the three or more cyclic portions consecutively decreases in length.

* * * * *